Patented Feb. 3, 1925.

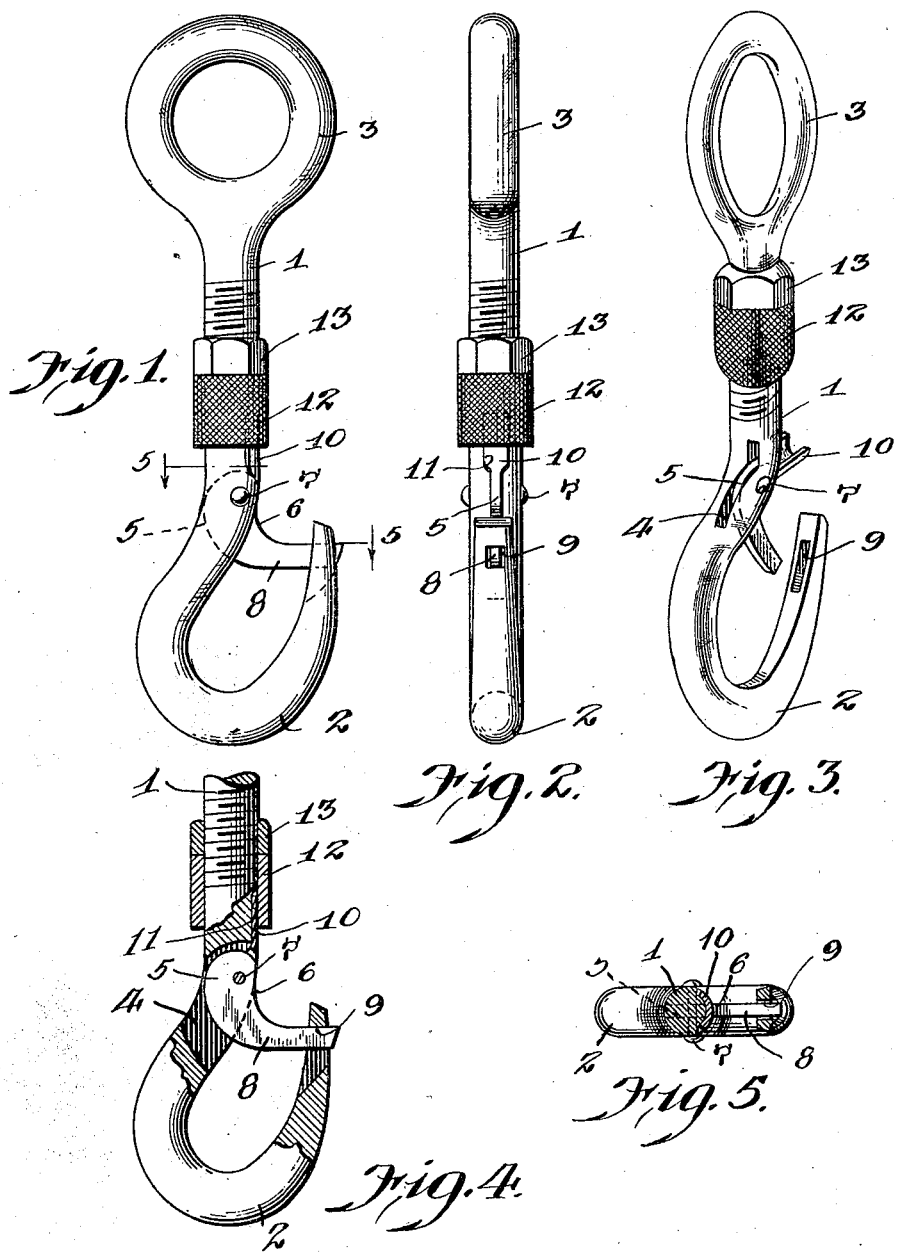

1,524,844

UNITED STATES PATENT OFFICE.

ALLAN R. SCOTT, OF SPOKANE, WASHINGTON, AND FRED C. LIDEL, OF ROUNDUP, MONTANA.

SAFETY LATCH HOOK.

Application filed April 24, 1924. Serial No. 708,742.

*To all whom it may concern:*

Be it known that we, ALLAN R. SCOTT, a citizen of the United States, and resident of Spokane, in the county of Spokane, State of Washington, and FRED C. LIDEL, a citizen of the United States, and resident of Roundup, county of Musselshell, State of Montana, have invented certain new and useful Improvements in Safety Latch Hooks, of which the following is a specification.

Our invention relates generally to improvements in hooks and more particularly to hooks having movable means for closing the passage between the point of the bill and the shank thereof, and it consists in the combinations, constructions and arrangements herein described and claimed.

An object of the invention is to provide a hook of the character described in which the closure for the space between the point of the bill and the shank of the hook is firmly supported when in closed position against movement in response to any stress thereon from the interior of the space between the bill and shank portions of the hook.

A further object of the invention is to provide a hook of the character described in which the means for closing the space between the point of the bill and the shank of the hook includes a latch pivotally attached to the shank and adapted to swing by gravity when released to open position in combination with means for holding the latch against movement from closed position firmly, although releasably, whereby accidental disengagement of the hook from any object to which it is fastened is precluded when the latch is in closed position and the hook is adapted to successfully withstand relatively great stresses.

A still further object of the invention is to provide a hook of the character described in which the latch is not likely to be broken or get out of order easily.

Other objects and advantages will be apparent from the following description, considered in conjunction with the accompanying drawings, in which—

Figure 1 is a side elevation of a hook embodying our invention, showing the latch in closed position, Figure 2 is a front view of the hook with the latch in closed position, Figure 3 is a perspective view of the hook with the latch in open position, Figure 4 is a fragmentary view mainly in side elevation and partly in vertical section, illustrating the manner of holding the latch in closed position, and Figure 5 is a section substantially along the line 5—5 of Figure 1, looking in the direction of the arrows.

A hook embodying the invention in the form now preferred by us comprises a shank 1 bent at one end to provide a hook 2 and fashioned at its other end to provide an attaching eye 3. The portion of the shank that is located in confronting relation to the point or free end of the bill of the hook is slotted longitudinally as indicated at 4 for the reception of the enlarged intermediate portion 5 of a latch designated generally 6 which is substantially L-shaped in longitudinal sectional contour or in other words has substantially the shape of a bell crank lever. The latch 6 is supported on a pivot element 7 which extends transversely through the slotted portion of the shank of a hook and through the intermediate portion 5 of the latch so that the intermediate portion of the latch may swing about the axis of a pivot element 7 until one arm of the latch, indicated at 8, has been swung outwardly from position between the bill and shank of the hook until the free end portion of the arm 8 is positioned in an opening or socket 9 in the free end portion of the bill of the hook in engagement with the outer wall of the socket or opening. At this time, the second arm of the latch 6, indicated at 10, is disposed flatwise against the bottom wall of a recess or cavity 11 which extends in the front wall of the shank 1 at the outer end of the slot 4. The arm 10 of the latch 6 may be relatively wide and both the arm 10 and the bottom of the recess 11 may be curved transversely to conform to the curvature of the shank 1 in cross sectional contour so that the outer wall of the arm 10 will closely contact with the inner wall of a locking sleeve which is slidable on the shank 1 when the arm 10 is disposed flatwise against the bottom of the recess 11 and the sleeve 12 has been slid on the shank 1 to position to overlap the arm 10, as illustrated in Figs. 1, 2 and 4. The locking sleeve 12 may be prevented from moving on the shank 1 toward the outer end of the latter or in other words toward the eye portion 3 from the position illustrated in Figures 1, 2 and 4 by a stop or retaining nut 13 which threadedly engages the shank 1 and therefore is adjustable longitudinally of the shank to permit movement of the sleeve 13 from overlapped relation to the arm 10 or to hold the sleeve 12 in overlapping relation to the arm 10, as desired.

Obviously, the sleeve 12 and the nut 13 may be formed integral with each other and the sleeve then adjusted longitudinally on the shank 1 by turning the nut 13 without departing from the spirit and scope of the invention.

From the foregoing description of the various parts of the device, the operation thereof may be readily understood. When the arm 10 is held within the cavity or recess 11 by the locking sleeve 12, the arms 8 will extend transversely across the passage between the bill portion and shank of the hook at the outer end of the passage and will close the latter so that the hook cannot accidentally disengage any object, such as a chain link, bail or the like to which the hook is fastened, in an ordinary manner. When the arm 8 of the latch is in position to close the passage between the bill portion and shank of the hook, the outer end portion of the arm 8 is in contact with the outer end wall of the opening or socket 9 in the bill of the hook and the arm 10 is also in contact over a relatively great area with the bottom wall of a cavity 11 in the shank. It therefore will be manifest that any stress on the arm 8 of the hook from the space between the bill portion of the hook and the shank inwardly of the arm 8 and tending to swing the arm outward from closed position will be resisted both by the end wall of the opening or socket 9 and by the bottom wall of the cavity or recess 11 and the latch 6 thus is securely and firmly held against displacement from closed position as a result of any internal stress. While ordinarily no stress is likely to be placed on the arm 8 tending to swing the latter inwardly from closed position, yet it is to be observed that any such stress will be firmly resisted when the locking sleeve 12 is in overlapping relation to the arm 11 since the locking sleeve 12 then will contact over a relatively great area with the arm 10 of the latch and will lock the latter securely to the shank of the hook. Should there be any external stress on the arm 8 of the latch when the latter is locked in position to close the passage between the bill portion and shank of the hook, the resultant stress on the locking sleeve will be exerted in a direction radial of the latter and therefore no stress on the retaining nut 13 tending to move the latter longitudinally of the shank and tending to strip or cause wear on the threads which connect the nut with the shank would result. A hook embodying our invention therefore is adapted to withstand relatively great stresses in service.

Obviously, our invention is susceptible of embodiment in forms other than that illustrated in the accompanying drawings and we therefore consider as our own all modifications and adaptations of the form of the device herein described as fairly fall within the scope of the appended claims.

We claim:—

1. In a hook of the character described, a shank having a straight portion and a portion at one end of the straight portion curved to provide a hook, said shank being provided with a slot extending longitudinally thereof at the juncture of the straight and curved portions thereof and in confronting relation to the outer end of the bill portion of the hook, a substantially L-shaped latch member having the bend portion thereof pivotally supported in said slot to swing about an axis extending transversely of said shank, the arms of said latch member diverging from their juncture with each other so that one arm will be swung flatwise against said shank when the latch has been swung about the axis of its pivotal support to cause movement of the other arm of the latch from position between the bill portion and the shank of the hook into engagement with said bill portion adjacent to the outer end of the latter, and a locking sleeve movable longitudinally of said shank to and from position to lock the first named arm of the latch to the shank when said first named arm of the latch has been swung against the shank, said shank being provided with a cavity at one end of said slot for the reception of the first named arm of the latch member, said first named arm of the latch member and the bottom wall of said cavity being correspondingly curved in cross sectional contour.

2. In a hook of the character described, a shank having a straight portion and a portion at one end of the straight portion curved to provide a hook, said shank being provided with a slot extending longitudinally thereof at the juncture of the straight and curved portions thereof and in confronting relation to the outer end of the bill portion of the hook, a substantially L-shaped latch member having the bend portion thereof pivotally supported in said slot to swing about an axis extending transversely of said shank, the arms of said latch member diverging from their juncture with each other so that one arm will be swung flatwise against said shank when the latch has been swung about the axis of its pivotal support to cause movement of the other arm of the latch from position between the bill portion and the shank of the hook into engagement with said bill portion adjacent to the outer end of the latter, and a locking sleeve movable longitudinally of said shank to and from position to lock the first named arm of the latch to the shank when said first named arm of the latch has been swung against the shank, said shank being provided with a cavity at one end of said slot for the reception of the first named arm of the latch member, said first named arm of the latch member and the bottom wall of said cavity being correspondingly curved in cross sectional contour, said first named arm of the latch member also conforming in cross sectional contour to the curvature of said shank.

3. A hook of the character described comprising a shank having an end portion thereof curved to provide the hook, said shank being formed with a slot extending longitudinally thereof at the juncture of the curved end portion and remaining portion of the shank, said slot being in confronting relation to the outer end portion of the bill of the hook, said outer end portion of the bill of the hook having a socket opening through the inner wall thereof, and a substantially L-shaped latch member having the bend portion thereof supported in said slot in the shank and adapted to swing about an axis extending transversely of said shank to position one arm of the latch member transversely across the space between the bill portion and the shank of the hook with the outer end of the arm in contact with the outer end wall of said socket and to position the other arm of said latch member flatwise against said shank.

4. A hook of the character described comprising a shank having an end portion thereof curved to provide the hook, said shank being formed with a slot extending longitudinally thereof at the juncture of the curved end portion and remaining portion of the shank, said slot being in confronting relation to the outer end portion of the bill of the hook, said outer end portion of the bill of the hook having sockets opening through the inner wall thereof, and a substantially L-shaped latch member having the bend portion thereof supported in said slot in the shank and adapted to swing about an axis extending transversely of said shank to position one arm of the latch member transversely across the space between the bill portion and the shank of the hook with the outer end of the arm in contact with the outer end wall of said socket and to position the other arm of said latch member flatwise against said shank, said shank having a cavity in its outer wall for the reception of the second named arm of the latch member, a sleeve adjustably engageable with the shank of the hook for releasably holding the second named arm of the latch member against displacement from said cavity, and a nut threadedly engaged with said shank for releasably holding said sleeve in engagement with said second named arm of the latch.

ALLAN R. SCOTT.
FRED C. LIDEL.